United States Patent [19]
Garvey et al.

[11] Patent Number: 5,573,217
[45] Date of Patent: Nov. 12, 1996

[54] SPECTACLES HOLDER

[76] Inventors: David K. Garvey, 53 Church Road, Smethwick, Warley, West Midlands B67 6HA, England; Lawrence Garvey, 75 Cheshire Road, Smethwick, Warley, West Midlands B67 6DW, England

[21] Appl. No.: 272,234

[22] Filed: Jul. 8, 1994

[51] Int. Cl.[6] .................................... G02C 11/00
[52] U.S. Cl. .................... 248/316.7; 211/13; 248/902
[58] Field of Search ................. 248/316.7, 902, 248/231.81; 211/13; D3/265

[56] References Cited

U.S. PATENT DOCUMENTS

| | | | |
|---|---|---|---|
| D. 152,254 | 1/1949 | Gallo | 248/902 X |
| 2,380,297 | 7/1945 | Dibert | 248/902 X |
| 2,623,722 | 12/1952 | Glunt et al. | 248/902 X |
| 2,656,917 | 10/1953 | Hollis | 248/902 X |
| 2,826,387 | 3/1958 | Rutten | 248/902 X |
| 2,997,270 | 8/1961 | Farndon | 248/902 X |
| 4,128,224 | 12/1978 | Guichard | |
| 4,715,575 | 12/1987 | Kemerer | |
| 4,903,925 | 2/1990 | Park | |
| 4,941,634 | 7/1990 | Gomes et al. | 248/902 X |
| 4,946,125 | 8/1990 | McCarty | |
| 5,082,225 | 1/1992 | Nespoli | |
| 5,137,242 | 8/1992 | Reath | 248/902 X |
| 5,195,668 | 3/1993 | Kunes et al. | 248/902 X |
| 5,340,071 | 8/1994 | Fox, II | 248/902 X |
| 5,372,345 | 12/1994 | Schmidt | 248/902 X |

FOREIGN PATENT DOCUMENTS

| | | | |
|---|---|---|---|
| 0803278 | 10/1958 | United Kingdom | |
| 1510087 | 5/1978 | United Kingdom | A47F 7/00 |

*Primary Examiner*—Ramon O. Ramirez
*Assistant Examiner*—Derek J. Berger
*Attorney, Agent, or Firm*—Laff, Whitesel, Conte & Saret, Ltd.

[57] ABSTRACT

A spectacles holder (1) comprises a frame (2) having restraining means (3, 32) and a resilient spring biasing member (4). A spring force applied to a pair of spectacles (28) by the biasing member (4) urges the spectacles (28) towards the restraining means (3, 32) which restrains the spectacles (28) against movement. The spectacles holder (1) thus grips the spectacles (28) between the biasing member (4) and the restraining means (3, 32).

18 Claims, 3 Drawing Sheets

SPECTACLES HOLDER

This invention relates to a holder for spectacles.

Spectacles can be awkward to store when they are not being worn. It is easy to break them if they are put in a pocket or left on a shelf or chair. It is known to put spectacles in rigid cases to protect them.

Drivers of vehicles sometimes have a pair of driving spectacles which they use exclusively for driving. Sometimes they have sunglasses for driving. Storing these in a car or other vehicle can be a problem.

Shops, such as opticians, display spectacles, or at least spectacle frames. At present they are displayed in an open configuration, with the arms of the spectacles extending at right angles to a lens-holding body of the spectacles, the arms enfolding a central portion of a display body, with the spectacles facing outwards, or hooking over a rear rail. Customers try on a pair of spectacles and sometimes do not put them back very carefully. It is easy for the arms to fail to return to their correct location position of the display body. Incorrectly replaced spectacles can look unsightly in that they may be out of line with the remainder of the, correctly positioned, spectacles, and incorrectly replaced spectacles are more likely to fall from the display body accidentally.

The aim of the present invention is to try to alleviate at least some of the problems discussed above.

According to a first aspect the invention comprises a spectacles holder for holding a pair of spectacles, the holder comprising a force-applying means and a restraining means, the force-applying means being adapted in use to urge a pair of spectacles towards the restraining means which restrains the spectacles against moving in response to said force, the spectacles being gripped between the force-applying means and the restraining means.

Thus the spectacles are positively held.

Preferably the force-applying means is a resilient member which is preferably deflected from its rest position by insertion of the spectacles into the holder.

The force-applying means may have a pocket region in which a portion of the spectacles is received. The pocket region may comprise the restraining means or it may not. The restraining means may comprise resilient means, preferably opposed to the force-applying means. The resilient means and the force-applying means may be of different stiffnesses.

The holder preferably urges a pair of spectacles towards a fully retained position, the spectacles being introducible by the user into the holder directly to the fully retained position and to positions other than the fully retained position.

The force-applying means, and preferably the pocket region, preferably has automatic adjustment means which automatically act upon a portion of a pair of spectacles which they engage so as to urge the spectacles towards the fully retained position. Thus a pair of spectacles released by the user in a position relative to the holder such that they are received in the holder, with the force-applying means acting on them, but which are a little way off the fully retained position, are automatically urged towards the fully retained position. This results in the spectacles effectively having only one retained storage position in the holder. When a display has more than one holder this ensures that the positions of the spectacles in the holders are substantially the same.

The automatic adjustment means may comprise a surface which applies said force to the spectacles, said force being applied in a direction generally towards the restraining means, but not directly towards it.

Preferably the holder is provided with retention means adapted to retain the spectacles in the holder. The retention means may comprise an inclined surface. The inclined surface may terminate in an abutment shoulder. The inclined surface may assist in urging the spectacles against the force-applying means such that the spectacles may locate in the restraining means.

The retention means provides a barrier to the spectacles falling out of the holder once located therein. If spectacles begin to fall out they may be pressed by the force-applying means against the retention means which impedes further travel of the spectacles out of the holder. The spectacles may be pressed against the abutment shoulder.

The holder may be provided with cam means adapted to introduce the arms of the spectacles into the region of the force-applying means. The cam means preferably introduces the arms at a predetermined position in relation to the force-applying means. This gives more control over how and where the arms are introduced.

The cam means may be the retention means.

Preferably the holder is provided with spring means. The spring means may be a resilient flap with a fixed end and a free end. When the spectacles are held in the holder the spring means may bias the spectacles against the force-applying means or pocket region. This provides a firm grip on the spectacles.

The restraining means preferably comprise a pocket, or a shelf.

The spectacles may be held in the holder in a manner different to that set forth above. The arms of the spectacles may not be located in the pocket region but may simply be pressed by the force-applying means against another part of the holder such that the spectacles are held by compression between these parts. If this is the case further retention may or may not be provided by the retention means or cam means.

The spectacles holder may have means for mounting a writing implement, such as a pen or pencil.

According to a second aspect the invention comprises a spectacles holder comprising a clip adapted to be releasably secured to a sun visor of a vehicle, and adapted to hold a pair of spectacles.

The clip may be in accordance with the first aspect of the invention.

According to a third aspect the invention comprises, in combination, a sun visor of a vehicle and a holder for spectacles mounted on the sun visor, the holder being adapted to releasably mount a pair of spectacles on the sun visor.

The combination may also include a pair of spectacles mounted on the sun visor by the holder.

According to a fourth aspect the invention comprises a method of reducing the chance of losing or breaking a pair of spectacles which are kept in a vehicle comprising clipping or otherwise retaining them to a sun visor of the vehicle.

Of course, the term spectacles embraces opthalmic spectacles, spectacles intended for cosmetic or other purposes and sunglasses.

Embodiments of the invention will now be described by way of example only, with reference to the accompanying drawings of which;

Figure 1:
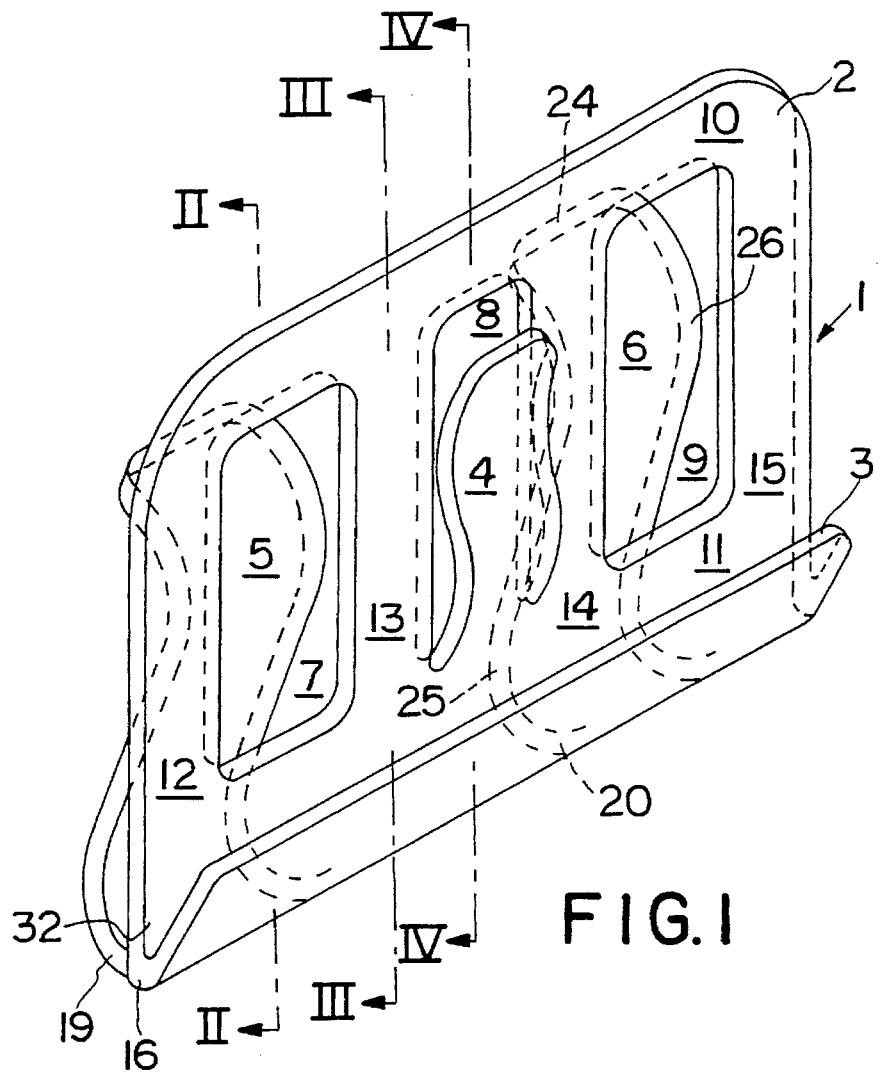
FIG. 1 is a perspective view of a spectacles holder in accordance with the invention.

A spectacles holder 1 is illustrated in FIGS. 1 to 6 of the drawings and comprises a body 2, a lip 3, a holding member 4 and clips 5 and 6. The lip 3 can be considered to define a pocket or shelf.

The body 2 has three regularly spaced apertures 7, 8 and 9 disposed along the length of the body 2 such that it is in the shape of two substantially parallel horizontal cross-members 10 and 11 attached together by four struts 12, 13, 14 and 15. The struts are all approximately the same length and width. The lip 3 is joined to a lower edge 16 of the cross-member 11 along the whole of its length. The cross-member 11 and lip 3 meet together at an acute angle.

Figure 4:
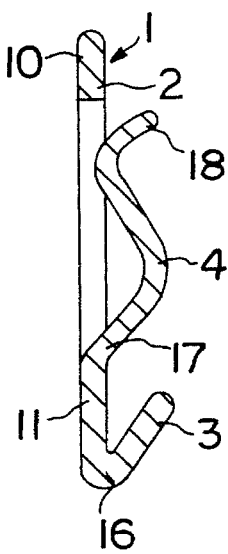
FIG. 4 is a cross-section taken along line IV—IV of the spectacles holder in FIG. 1.

The holding member 4 extends from the lower inside edge of the central aperture 8. The holding member 4 is generally S-shaped (as shown in FIG. 4) with a lower end 17 joined to the body 2 and a free unattached upper end 18.

Figure 2:
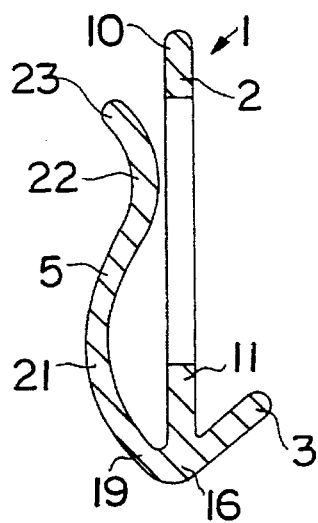
FIG. 2 is a cross-section taken along line II—II of the spectacles holder in FIG. 1.
Figure 3:
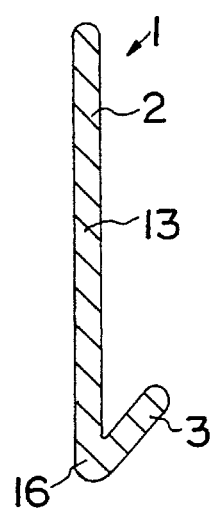
FIG. 3 is a cross-section taken along line III—III of the spectacles holder in FIG. 1.

FIG. 2 shows the clip 5 in more detail. A lower end 19 of the clip 5 is joined to the lower edge 16 of the body 2 and is located approximately at the region of the aperture 7. The lower end 19 and lower edge 16 meet at an acute angle and the clip 5 extends outwards from the body 2 in a bow 21. An upper part 22 of the clip 5 is directed inwards towards the body 2. A free upper end 23 of the clip 5 extends away from the body 2. The clip 5 is generally S-shaped.

Referring back to FIG. 1, the clip 6 is similar in construction to the clip 5. It has a fixed lower end 20 and a free upper end 24 and is generally S-shaped with a bow 25, and an upper inwardly extending part 26. The fixed lower end 20 of the clip 6 is joined to the body 2 approximately beneath the aperture 9.

All of the above parts are integrally formed as a unitary moulding of resilient plastics material. Alternatively the spectacles holder 1 may be formed from metal, metal coated with plastics, or metal or plastics with a decorative coating (such as brass plating or gold finishing). Any springy material may be suitable.

Figure 5:
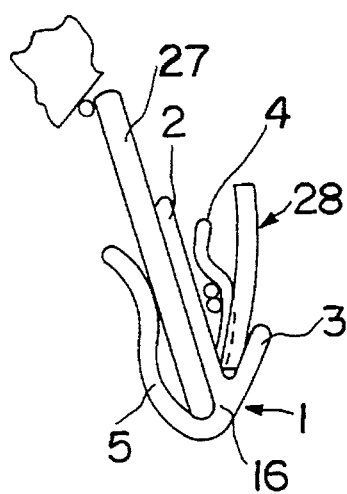
FIG. 5 is a side view of the spectacles holder in use with a sun visor in accordance with the second aspect of the invention.

FIG. 5 shows the holder 1 in use. The clips 5, 6 and the holder 4 are elastically deformable and act as spring clips. The clips 5, 6 are used to locate the holder 1. In this case the clips are attached to a sun visor 27 of a car or other vehicle. The visor is held between the inner faces of the upper parts 22 and 26 and the body 2. The inner faces of parts 22 and 26 may be provided with teeth or ridges allowing the clips 5 and 6 to hold onto the sun visor more positively. A pair of spectacles 28 is shown held by the holder 1.

Figure 6:
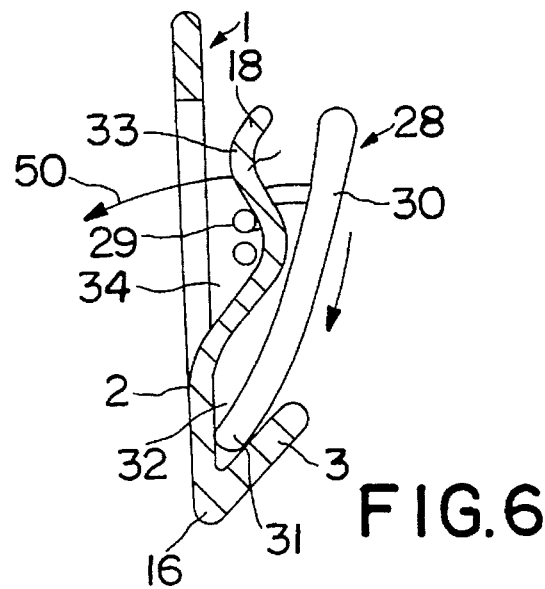
FIG. 6 is a side view of a pair of spectacles being located in the spectacles holder.

FIG. 6 illustrates the operation of the holder 1 in more detail. The holder 1 is in an upright position with cross-member 10 uppermost. A pair of folded spectacles 28 are slid downwards in the direction shown by the arrow such that the end 18 of the holding member 4 passes between the arms 29 of the spectacles 28 and the frame 30. The arms 29 are thus located between the body 2 and the holding member 4 and the frame is disposed on a side of the holding member 4 opposite to the arms 29. A bottom end 31 of the frame locates in a recess 32 formed by the junction of the lip 3 and the cross-member 11.

In pushing the spectacles 28 downward to locate as described, the holding member 4 is elastically deformed away from the body 2. This deformation is at its greatest when the arms 29 pass over a bend 33 in the holding member 4. Once the arms are over the bend the holding member returns towards its original relaxed position but is restrained from doing so by the presence of the arms 29 located in a trough 34. The holding member exerts a downward force on the spectacles 28 as shown by an arrow 50. The arms 29 are thus held by the holding member 4, the bottom end 31 of the frame 30 is held in the recess 32 and therefore the spectacles 28 are positively located in the holder 1. The holding member applies downward pressure to the arms approximately at their cross-over point and forces the bottom end of the frame to locate in the recess 32. In this way the holding member 4 can be considered to be force-applying means and the lip 3 restraining means. Thus even if the spectacles 28 are not inserted correctly into the holder 1 a degree of self-centring can occur and the spectacles 28 can slide until the whole of the bottom end 31 of the frame 30 is firmly located in the recess 32.

It is possible to insert spectacles into the holder 1 in an opposite sense such that the front of the spectacles 28 would face the body 2 and the nose piece of the spectacles is inserted between the body 2 and the holding member 4 and becomes retained in the trough 34. The arms 29 would be facing away from the body 2. The spectacles would be held in a way similar to that described above with a spring force generated by the elastically deformed holding member 4 acting on the nose piece and forcing the bottom end 31 of the frame 30 into the recess 32.

It may be desirable to omit the clips 5 and 6 from the construction of the holder and to provide alternative fixing means, for example self adhesive material fixed to the body 2 in place of the clips 5 and 6. In this way the holder could be mounted at a variety of locations such as a vehicle dash board, window, glove compartment, shelf or sun roof. Other fixing means are also envisaged such as holes in the body to enable the holder 1 to be screw mounted to a suitable surface.

Figure 7:
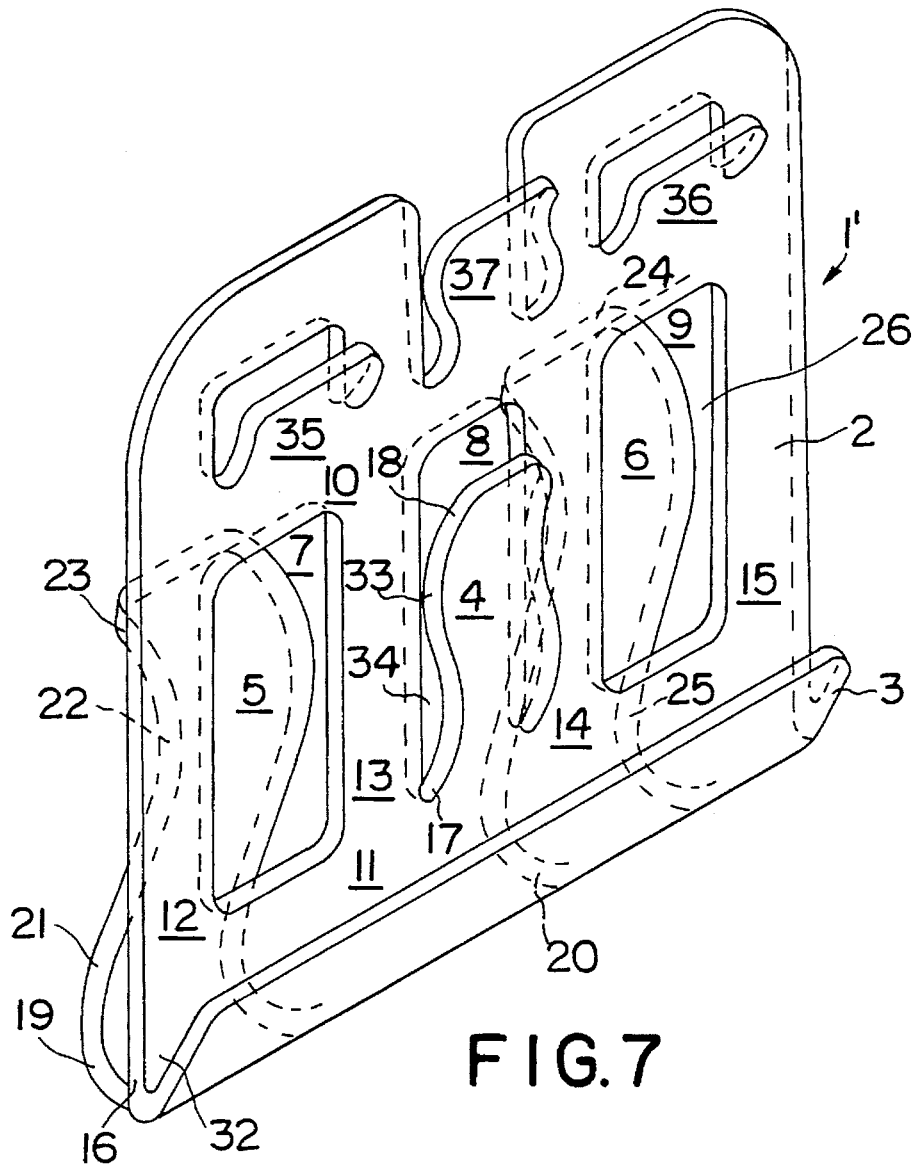
FIG. 7 is a perspective view of another spectacles holder.

An alternative holder 1' is shown in FIG. 7. It is similar in construction to the holder 1 and corresponding reference numerals have been applied to corresponding parts. In addition the holder 1' has two shelves 35 and 36 defining pockets disposed to either side of a spring clip 37. This arrangement forms a pen holder, a pen (not shown) can be received in the pockets defined by the shelves 35, 36 and be held in place by a spring force from the spring clip 37.

Figure 8:
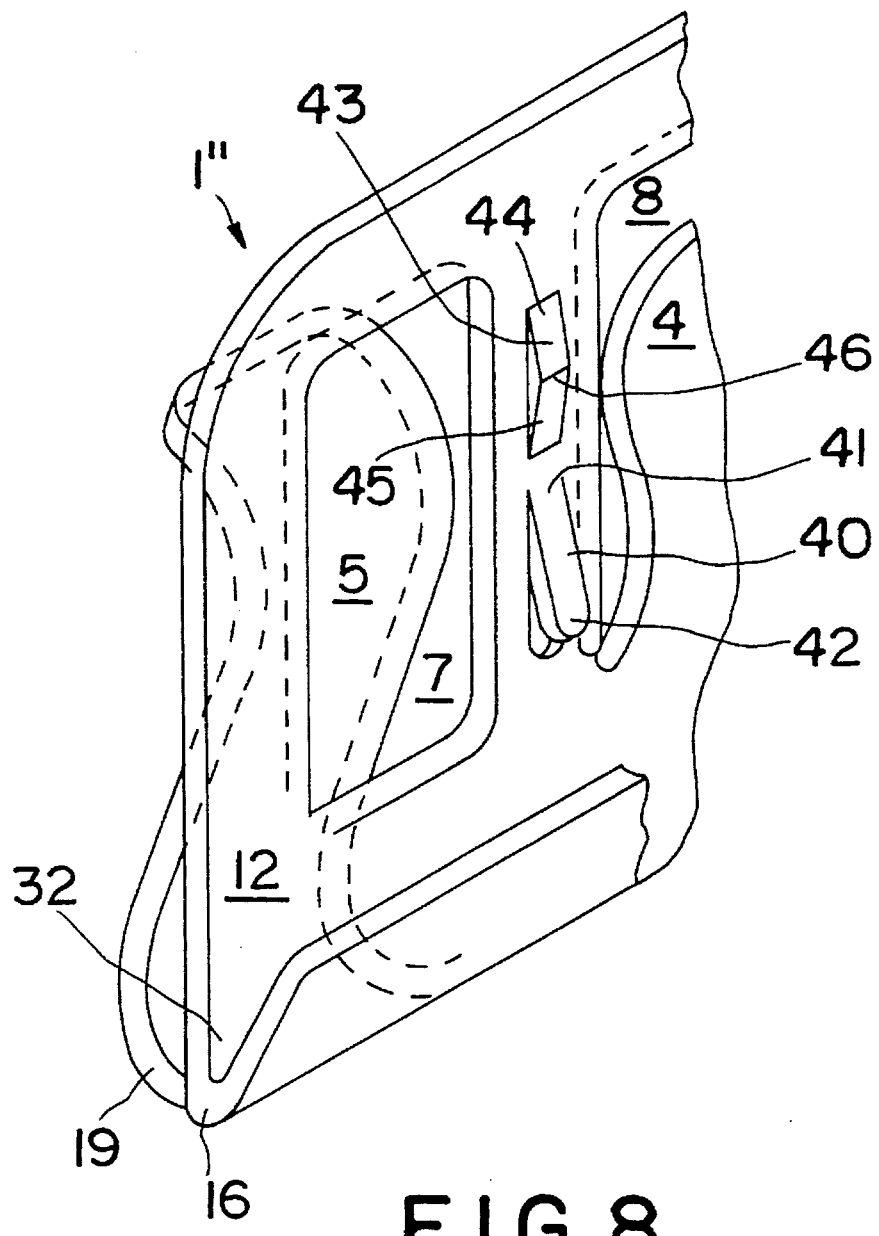
FIG. 8 is a perspective view of a fragment of a further spectacles holder.

An embodiment of a third holder 1" is shown in fragmentary form in FIG. 8. The spectacles holder is basically similar in construction to that shown in FIG. 1, and corresponding reference numerals have been applied to corresponding parts. The differences lie in additional parts being provided along struts 13 and 14. Although only strut 13 is shown in the drawings, strut 14 is provided with identical additional parts to perform identical functions and the following description reflects this fact.

At the lower end of the struts 13 and 14 are springy flaps 40 each having one end 41 fixed to the strut and another end 42 which is free to be pushed towards the strut. When so pushed, the flaps provide a resistive spring force. The fixed ends 41 of the flaps 40 are nearer to the lip 3 than the bend 33 of the holding member 44, and the free ends 42 of the flaps 40 are disposed at portions of the struts as to be beside the trough 34. Ramps 43 are located on the struts, above the flaps 40. Each ramp 43 comprises two inclined faces 44 and 45 which rise to meet at a ridge portion 46. The ridge portion is disposed at a portion of the strut so as to be beside the bend 33.

In use the holder operates in a similar manner to that described above. However the ramps 43 assist in insertion of a pair of spectacles and the ramps 45 and the flaps 40 assist in retention of a pair of spectacles. As the spectacles are inserted into the holder, the folded arms of the spectacles rise up the inclined faces 44 and move away from the struts 13 and 14 thus pushing on the holding member 4 and elastically deforming it away from the holder 1. The holding member 4 presses the folded arms against the ramps 43 and the arms ride over the ridge portions 46 and then down the inclined faces 45. The arms then become located in the trough 34 and the holding member 4 exerts a downward force on the arms of the spectacles. The arms are pushed into contact with the flaps 40 and the flaps are deformed such that the free ends are pushed towards the struts. Thus the arms of the spectacles are held in place by resilient springy forces pressing from both sides and provided by the flaps 40 and the holding member 4. The flaps 40 serve as resilient biasing to the spectacles to prevent them from rattling within the holder.

Once the spectacles are located, a second, retention or stop function of the ramps 43 comes into play. The inclined faces 45 serve as obstacles or stops that the arms of the spectacles have difficulty passing over (due to the force of the holding member pressing from the other side). Consequently it is difficult for the spectacles to "pop out" of the holder, for example if the holder and spectacles are subject to a sudden force (if the holder is attached to a sun visor in a car this may arise from the car having its brakes applied).

The sloping face 45 also assists in removal of the spectacles. In an alternative arrangement the sloping face 45 could be an abutment shoulder or face.

The spring flaps 42 are easier to bend from their free position than the holding member 4. The arms of a pair of spectacles are held in use between the flaps 42 and the trough 34 of the holding member 4. The holding force between the flaps 42 and member 4 may be generally "horizontal", or transverse to the height of the holder (without having a significant downward component tending to push the spectacles into the recess 32). Alternatively there may still be an overall resultant force pushing the spectacles into the recess 32. It will be appreciated that the flaps 42 apply a force to the spectacles which has an upward component.

Modified holders may have flaps 42 or the like, but no retention means ramp 43, or vice-versa. Of course one modified holder we envisage is that illustrated in FIG. 8, but with the pen-holder of FIG. 7.

Although spectacles come in many shapes and sizes, most spectacles have a nose piece and arms in approximately the same position and the holders 1, 1', and 1" would be suitably for many different kinds of spectacles.

When the holders are used in opticians a plurality of holders (without clips 5 and 6) may be provided attached to mounting boards.

We claim:

1. A spectacles holder for holding a pair of spectacles comprising a wall member having a first side surface and a second side surface; pocket means provided at a lower portion of said first side, said pocket means comprises all elongate pocket member of substantially the same width as said wall member and being inclined at an angle to said wall member so as to form a "V" shaped pocket region between said first surface and said pocket member; two substantially "S" shaped, resilient, clips protruding from said second side surface and being oriented so that the longitudinal axes of said clips are substantially at 90° to the elongate direction of said pocket means; a resilient main finger protruding from said first side surface, substantially at the middle of said pocket region, said main finger being attached to said wall member at a first end, in a central region of said pocket region, and a second end of said main finger being unattached to said surface wall member; two auxiliary fingers also protruding from said first side surface, one on each side of said main finger, said auxiliary fingers comprising elongate members attached to said first surface at a first end and extending at angle to said first surface towards said pocket means; and two raised ramp members each projecting away from said first surface and each substantially in line with a respective auxiliary finger, in the direction of elongation of said auxiliary fingers, said main finger and said auxiliary fingers each extending in a direction substantially perpendicular to the direction of elongation of said pocket, said ramp members being adapted to resist the removal of a pair of spectacles from said pocket.

2. A spectacles holder for holding a pair of spectacles comprising restraining means which comprises a pocket having an elongate length, and force-applying means adapted to urge spectacles when in said pocket, said force-applying means comprising at least one resilient finger which has substantially less width in the direction of an elongate width of said pocket than does said pocket, and said finger having a surface such that in use engagement of spectacles when in contact with said surface tends to urge said spectacles into said pocket so as to restrain said spectacles, when present spectacles being gripped between said force-applying means and said restraining means, said pocket receiving a lower portion of at least an eyepiece of spectacles when present and stop means adapted to retain the arms of a pair of spectacles when a pair of spectacles is mounted in said holder, said stop means comprising a pair of ramps, one to either side of said resilient finger, said stop means co-operating in use with said resilient finger so as to resist movement of the arms of spectacles away from said pocket in a direction perpendicular to said elongate direction of said pocket.

3. A spectacles holder according to claim 2, in which the force-applying means is deflected from its rest position by insertion of spectacles into the holder.

4. A spectacles holder according to claim 2 which is adapted to urge a pair of spectacles towards a fully retained position, when the spectacles are introducible by the user into the holder directly to the fully retained position and to positions other than the fully retained position.

5. A spectacles holder according to claim 4, wherein said resilient finger is adapted to urge a pair of spectacles that it contacts into said pocket to their maximum extent, the arrangement being such that a pair spectacles that is received in said pocket and engaged by said finger, but is not fully received in said pocket, is urged by said finger deeper into said pocket towards said fully retained position.

6. A spectacles holder according to claim 2, in which the force-applying means has automatic adjustment means which automatically urge a portion of a pair of spectacles which they engage towards the fully retained position.

7. A spectacles holder according to claim 2, in which mounting means are provided, in addition to said pocket and said resilient finger for releasably mounting a writing implement upon the holder.

8. A spectacles holder according to claim 2, comprising a clip adapted to be releasably secured to a sun visor of a vehicle, and adapted to hold a pair of spectacles.

9. A combination comprising a sun visor of a vehicle and a holder for spectacles according to claim 2, mounted on the sun visor, the holder being adapted to releasably mount a pair of spectacles on the visor.

10. A spectacles holder according to claim 2 wherein a planar back member is provided, said finger protruding from said back member at an angle and said pocket being provided at a lower region of said back member.

11. A spectacles holder according to claim 2 in which said finger is adapted in use to apply a force to the spectacles, said force having a component of force in a first direction such as to urge the spectacles into said pocket and another component of force in a direction transverse to said first direction.

12. A spectacles holder according to claim 2 in which said finger is provided at the middle region of said pocket, along the elongate length of said pocket.

13. A spectacles holder according to claim 2, in which spectacles are introduced to said elongate pocket by movement along a direction of introduction, and wherein stop means is provided, said stop means retaining spectacles in said holder by resisting movement of spectacles in the direction opposite to the direction of introduction of spectacles.

14. A spectacles holder according to claim 2, wherein stop means are provided, said stop means being adapted to retain the arms of a pair of spectacles when a pair of spectacles is mounted in said holder, said stop means co-operating in use with said resilient finger so as to resist movement of the arms of spectacles away from said pocket in a direction perpendicular to said elongate direction of said pocket.

15. A spectacles holder according to claim 2, wherein cam surfaces are provided to assist the introduction of the arms of a pair of spectacles to a gripping region defined at least in part by said resilient finger.

16. A spectacles holder according to claim 15, wherein a pair of said camming means is provided, with each said camming means aligned, in the direction transverse to said elongate direction, with a respective one of said ramps.

17. A spectacles holder according to claim 16, wherein a pair of secondary resilient fingers are provided, one to either side of said resilient finger, said secondary resilient fingers being adapted in use to urge the arms of a pair of spectacles towards said resilient finger, and wherein each said secondary finger is aligned, in the direction transverse to said elongate direction of said pocket, with a respective one of said ramps.

18. A spectacles holder according to claim 2, wherein one or more secondary resilient fingers are provided, said secondary fingers urging in use the arms of a pair of spectacles towards said resilient finger.

* * * * *